(12) United States Patent
Moses et al.

(10) Patent No.: US 11,159,490 B2
(45) Date of Patent: Oct. 26, 2021

(54) METHODS AND DEVICES FOR SERVICE-DISCOVERING REVERSE-TUNNEL PROXY AND TUNNEL SERVICE CENTER

(71) Applicant: F5 Networks, Inc., Seattle, WA (US)

(72) Inventors: Joel Benjamin Moses, Seattle, WA (US); Steven Dabell, Liberty Lake, WA (US); William Ross Baumann, Seattle, WA (US); Timothy Scott Michels, Liberty Lake, WA (US)

(73) Assignee: F5 NETWORKS, INC., Seattle, WA (US)

( * ) Notice: Subject to any disclaimer, the term of this patent is extended or adjusted under 35 U.S.C. 154(b) by 353 days.

(21) Appl. No.: 16/181,008

(22) Filed: Nov. 5, 2018

(65) Prior Publication Data

US 2019/0312841 A1    Oct. 10, 2019

Related U.S. Application Data

(60) Provisional application No. 62/581,593, filed on Nov. 3, 2017.

(51) Int. Cl.
*H04L 29/06* (2006.01)
*H04L 29/08* (2006.01)

(52) U.S. Cl.
CPC ........ *H04L 63/029* (2013.01); *H04L 63/0272* (2013.01); *H04L 63/0281* (2013.01); *H04L 67/10* (2013.01)

(58) Field of Classification Search
CPC .............. H04L 63/029; H04L 63/0272; H04L 63/0281; H04L 67/10
See application file for complete search history.

(56) References Cited

U.S. PATENT DOCUMENTS

| 2015/0058459 | A1* | 2/2015 | Amendjian | ......... G06F 9/45558 709/223 |
| 2017/0171182 | A1* | 6/2017 | Yanacek | ................. H04L 63/08 |

* cited by examiner

*Primary Examiner* — Hee K Song
(74) *Attorney, Agent, or Firm* — Troutman Pepper Hamilton Sanders LLP (Rochester)

(57) ABSTRACT

Methods, non-transitory computer readable media, network traffic management apparatuses, and network traffic management systems that utilize a reverse tunnel proxy in a cloud environment. The reverse tunnel proxy in a cloud environment automatically discovers its environment and creates an appropriate tunnel without using a public IP. The reverse tunnel proxy in a cloud environment utilizes an outgoing connection along with an initialization and channelization to connect to the cloud and accepts an incoming connection in response. In embodiments, a cloud initiates a connection and a tunnel is created without need for additional IP addresses. In embodiments, the reverse tunnel proxy in a cloud environment connects to a client as a server and a private key is stored at a server side without pushing private keys into a public environment.

15 Claims, 6 Drawing Sheets

METHODS AND DEVICES FOR SERVICE-DISCOVERING REVERSE-TUNNEL PROXY AND TUNNEL SERVICE CENTER

CROSS REFERENCE TO RELATED APPLICATION(S)

This document is a nonprovisional patent application, claiming the benefit of, and priority to, U.S. Provisional Patent Application Ser. No. 62/581,593, filed on Nov. 3, 2017, also entitled "METHODS AND DEVICES FOR SERVICE-DISCOVERING REVERSE-TUNNEL PROXY AND TUNNEL SERVICE CENTER," which is hereby incorporated by reference in its entirety.

FIELD

The present disclosure technically relates to application traffic management (ATM) for Cloud infrastructure and services. More particularly, present disclosure technically relates to application optimization for tunneling. Even more particularly, present disclosure technically relates to application optimization in relation to application security for security socket layers (SSLs), tunneling for a virtual private network (VPN), scaling for hardware, and Hybrid Cloud.

BACKGROUND

In the related art, in competing for the lowest price for cloud computing, the cloud computing industry is now teeming with many Cloud Service Providers (CSPs), including Amazon® (AWS), Microsoft® (Azurec®), Rackspace®, Digital Ocean®, and Google® Compute Engine just to name a few. As the number of CSPs increases, many Cloud customers desire to transparently deploy applications and services across many vendors for harnessing redundancy, reliability, scalability, and cost savings. To enable efficient platform independent deployment, software development operations (DevOps) methodologies, leveraging containers, e.g., Docker containers, have evolved which largely solve cross-Cloud deployment challenges.

Many related art pricing models have been used by Cloud vendors from fixed-cost, short-term contracts to long-term contracts. However, a new trend is emerging in pricing options for Cloud providers which dynamically adjust resource pricing as a function of demand and resource availability, commonly referred to as "spot pricing." For example, Amazon® offers this pricing "spot pricing" model. Thus, managing a web service deployment across many different providers has become quite feasible. Yet, heretofore, economically optimizing the distribution of native cloud or hybrid-based web services across non-homogeneous Cloud providers to optimize static and dynamic real-time pricing models has been very challenging. Thus, a need exists in the related art for applying load-balancing to non-homogeneous Cloud resources where the cost models for leased Cloud resources may be dynamically changing.

With respect to "vendor-agnostic" or "best-of-breed" Cloud application services, the Cloud provider industry has aggressively developed sets of minimal application services that are deployable via their managed APIs. Amazon® (AWS), Microsoft® (Azure®), Rackspace®, Digital Ocean®, and Google® Compute Engine provide service layers, such as caching, load-balancing, and firewall controls. However, these services layers rarely meet the minimum definition of "best-of-breed" for the respective service. Additionally, as customers pursue the best "spot price" for computing, the customers are forced to rework their policy and service definitions to support the policy and service definitions relating to the newly-selected CSP's API. This circumstance adds time and complexity onto the migration from one CSP to another CSP. Further, customers who wish to deploy services that enjoy greater depth and functionality, or customers who are highly attached using "best-of-breed" products in their services tier, frequently find that the cost inherent to the replication of these services, for each application workload, greatly exceeds the cost of the workload itself.

With respect to the complexity of tiering infrastructure alongside CSP networks, customers who wish to create a centralized "service tier" infrastructure must deal with the following characteristics: managed latency, secure transit of application traffic to the workload tier, creation of cross-network routing topologies, and configuration of the underlying network space to avoid overlap. In the related art, care must be taken in the setup of such networking environment when any new workload group is added to the configuration in order to avoid outages caused by a misconfiguration. Many customers lack tight control over the initial setup of this environment when the application developers first build the workload group.

With respect to security exposure and control concerns, customers, in the related art, are challenged by many aspects of public CSP environments that encourage the attachment and termination of Public IP addressing to workload components. Each Public IP address that is attached to a CSP workload not only consumes a resource, thereby incurring extra workload cost, but, by its very use, increases the potential attack surface in relation to the application itself. Further, customers express a concern regarding the need to store sensitive data related to internetworking or transport-layer security within the CSP's workload environment itself. The storage of SSL private keys within the CSP environment may present issues with compliance or mandate certain things within the environment, such as usage of hardware security modules (HSMs) for key storage, whereby additional costs is often incurred. Also, depending on the CSP, HSMs may not be generally available in the first instance. Conversely, provisioning Internet Protocol security (IPsec) tunneling keys into the CSP's API for establishment of packet-based tunnels may have the same compliance concerns. Thus, a need exists in the related art for a solution that dispenses with the foregoing concerns.

Therefore, a need exists in the related art for methods and device that apply load-balancing to non-homogeneous Cloud resources where the cost models for leased Cloud resources may be dynamically changing, that economically optimize storage of SSL private keys "within the CSP environment, that deploy services having greater depth and functionality, wherein the cost thereof does not exceed the application workload itself, and that eliminate security exposure and control concerns relating to storage of SSL private keys within the CSP environment.

SUMMARY

In addressing at least the challenges experienced in the related art, the present disclosure involves methods and device that apply load-balancing to non-homogeneous Cloud resources where the cost models for leased Cloud resources may be dynamically changing, that economically optimize storage of SSL private keys within the CSP environment, that deploy services having greater depth and functionality, wherein the cost thereof does not exceed the application workload itself, and that eliminate security exposure and control concerns relating to storage of SSL private keys within the CSP environment.

In accordance with embodiments of the present disclosure, the methods and devices generally utilize a reverse-tunnel proxy in a cloud environment, implementable by a network traffic management system comprising at least one of a network traffic apparatus, at least one client device, at least one server devices, and involve: automatically discovers the cloud environment; and creating an appropriate reverse tunnel without using a public IP.

BRIEF DESCRIPTIONS OF DRAWINGS

DETAILED DESCRIPTION

Figure 1:
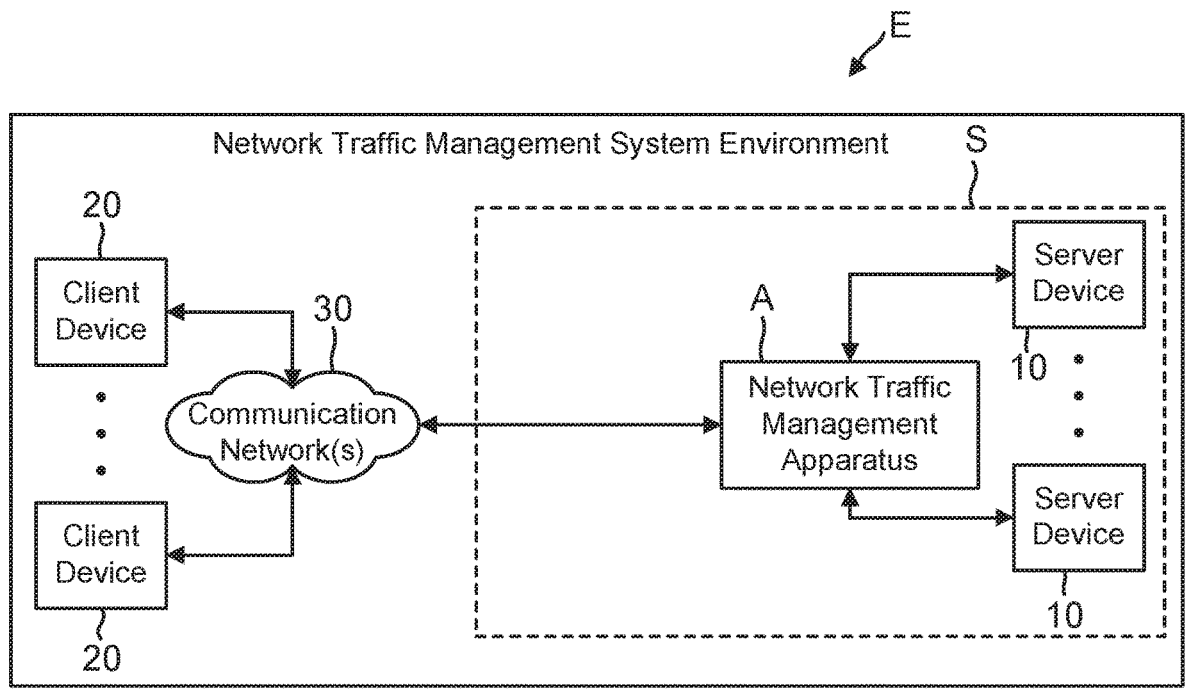
FIG. 1 is a schematic diagram illustrating an exemplary network environment which incorporates a network traffic management system.

Embodiments are disclosed that implement methods and devices that may be implemented in a network traffic management apparatus of a network traffic management system, by example only. The methods and devices of the present disclosure involve features, wherein a small proxy is provided atop an instance (a concrete occurrence of any object, existing usually during the runtime of an application program), a container (using resource isolation features of a kernel, such as cgroups and kernel namespaces, and a union-capable file system to allow independent "containers" to run within a single instance), or a workload server, whereby a secure outgoing, authorized, and secure connection through pre-existing network topologies is providable. The small proxy can also discover network-adjacent services and publish the network-adjacent services to a "service center," wherein application services are applied. The service center understands the relationship of the small proxy to the CSP environment and to the workload hosts located in the CSP environment. The service center then leverages the existing established connection to forward session flows towards the hosts located in the CSP environment from the service tier.

In particular, the methods and devices of the present disclosure implement a tunnel proxy utilizing a reversed-direction secure connection as well as the registration and termination of the reversed-direction secure connection for initiating application traffic to workload instances that sit behind an instance of the tunnel proxy. Embodiments of the the present disclosure apply a reverse-tunnel proxy to a centralized service tier and generally comprise the following features: (a) the use of a secure connection initiated from a proxy instance to at least one service center element for communicating at least one network-adjacent resource to a service center; (b) the use the pre-established connection to forward application traffic towards the at least one network-adjacent resource communicated as being available behind the proxy instance; (c) the discovery of at least one network adjacent service from the proxy instance or the discovery of an environment by a central controller, e.g., apart from the proxy instance, and communication of information relating to the discovery of the environment to one of the proxy instance and at least one service center; (d) the registration and authorization of unknown proxy instances by the service center, and the establishment of authorization to tunnel resources; (e) the ability to, from a proxy instance, publish only the resources available on that local instance if desired; (f) the auto-creation of routing instances and node-mapped configurations at the service center based on the continuous service discovery done by the proxy instance or central controller; and (g) the registration of one or more proxy instances within a single CSP environment to a service center allowing for the service center to scale traffic across the reverse tunnels horizontally.

In embodiments of the methods and devices of the present disclosure, the tunnel proxy and service center functionality provide quantifiable cost savings to customers, a mechanism for facilitating creation of CSP-agnostic service tiers, and a competitive advantage to load-balancing across both private and public Cloud vendors, whereby hybrid Cloud topologies may be developed. Embodiments of the present disclosure may use a reverse-tunnel proxy for at least one of: inserting a BIG-IP system as a cloud service provider in a public cloud; and linking non-cloud data providers as end points.

Referring to FIG. 1, this schematic diagram illustrates an exemplary network environment E which incorporates an exemplary network traffic management system S, the system S comprising a network traffic management apparatus A, in accordance with an embodiment of the present disclosure. The network traffic management apparatus A is coupled with a plurality of server devices 10 and a plurality of client devices 20 via at least one communication network 30. However, the network traffic management apparatus A, the server devices 10, and/or client devices 20 may be coupled together via other topologies as well. Additionally, the network traffic management system S may include other network devices, such as at least one router (not shown) and/or at least one switch (not shown), for example. The environment E provides many advantages, including, but not limited to, network traffic management methods, network traffic management systems, network traffic management apparatuses, and non-transitory computer readable media, that are capable of preventing a cyber-attack by automatically detecting attack signatures and generating attack signature identifications.

Figure 2:
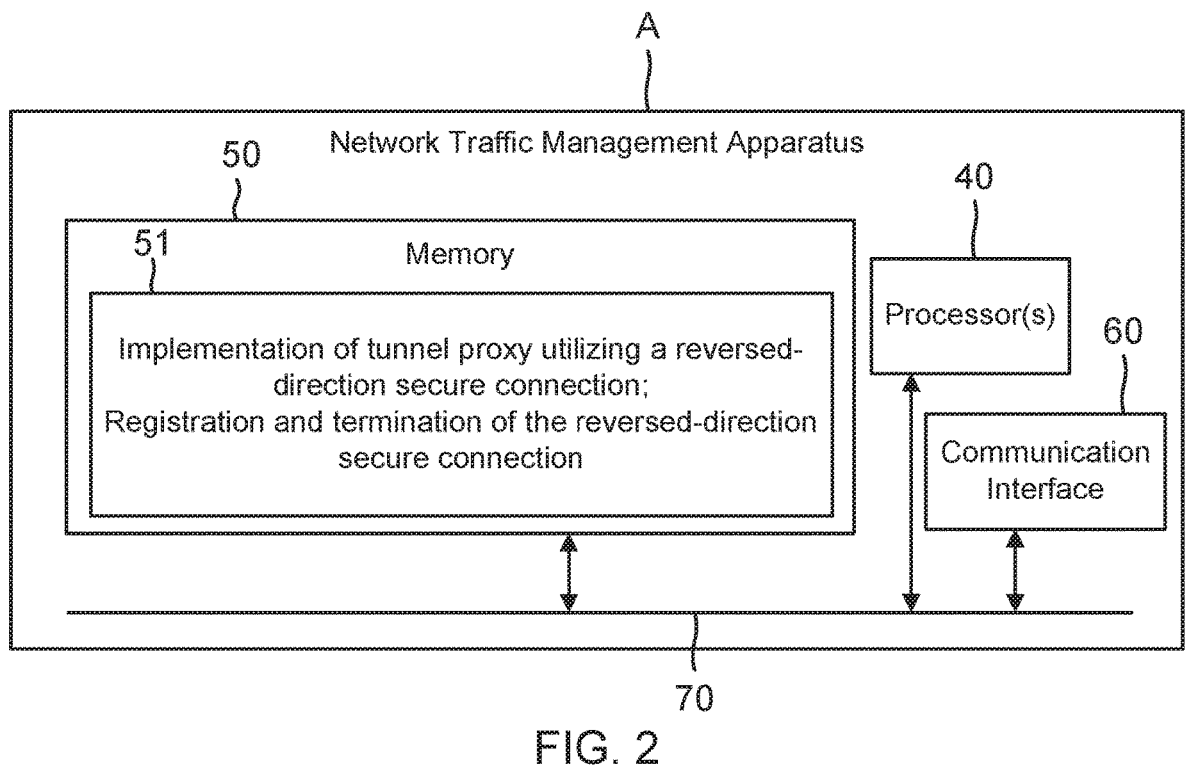
FIG. 2 is an exemplary block diagram of a network traffic management apparatus.

Referring to FIG. 2, this schematic diagram illustrates an exemplary network traffic management apparatus A of an exemplary network traffic management system S, as shown in FIG. 1, in accordance with an embodiment of the present disclosure. The network traffic management apparatus A performs any number of functions, including automatically detecting attack signatures and generating attack signature identifications for preventing a cyber-attack. The network traffic management apparatus A comprises at least one processor 40, at least one memory 50, and/or a communication interface 60 which are coupled together by a bus 70 or other communication link. However, the network traffic management apparatus A can include other types and/or numbers of elements in other configurations.

Still referring to FIG. 2, the at least one processor 40 of the network traffic management apparatus A may execute programmed instructions, e.g., at least one set of executable instructions, that are stored in the at least one memory 50 of the network traffic management apparatus A for the any number of the above-identified functions. The at least one processor 40 of the network traffic management apparatus A may include at least one CPUs or at least one general purpose processor, each at least one general purpose processor having at least one processing core (not shown), for example, although other types of processors can also be used.

Still referring to FIG. 2, the at least one memory 50 of the network traffic management apparatus A stores the programmed instructions for at least one aspect of the technology, in accordance with the present disclosure. However, some, or all, of the programmed instructions could be stored elsewhere. A variety of different types of memory storage devices or memory devices 51, such as random-access memory (RAM), read-only memory (ROM), hard disk, solid state drives, flash memory, cloud storage, or any other computer-readable medium, from which information is read and to which information is written, e.g., by a magnetic, optical, or other reading and writing system that is coupled to the at least one processor 40, can be used for the memory 50.

Still referring to FIG. 2, the memory 50 of the network traffic management apparatus A can store at least one application program or "application(s)" comprising a set of executable instructions, e.g., a set of computer-executable instructions that, when executed by the network traffic management apparatus A, cause the network traffic management apparatus A to perform actions, such as transmitting, receiving, or otherwise processing messages, for example, and to perform other actions described herein and shown in FIGS. 3-7. The application(s) can be implemented as modules or components of other application(s). Further, the application(s) can be implemented as operating system extensions, module, plugins, and/or the like.

Still referring to FIG. 2, even further, the application(s) may be operative in a cloud-based computing environment. The application(s) can be executed within or as virtual machine(s) or virtual server(s) that may be managed in a cloud-based computing environment. Also, the application(s), and even the network traffic management apparatus A itself may be located in virtual server(s) running in a cloud-based computing environment, rather than being tied to one or more specific physical network computing devices. Also, the application(s) may be running in one or more virtual machines (VMs), executing on the network traffic management apparatus A. Additionally, in one or more embodiments of this technology, virtual machine(s) running on the network traffic management apparatus A may be managed or supervised by a hypervisor Still referring to FIG. 2, in this particular example, the memory 50 of the network traffic management apparatus A comprises at least one memory storage device, e.g., a nontransient memory device 51 for implementing or applying a reverse-tunnel proxy in centralized service tier, e.g., a cloud environment, although the memory 50 can include other policies, modules, databases, or applications, for example. The disclosed reverse-tunnel proxy utilizes a reversed-direction secure connection, and the registration and termination of this connection for the purpose of initiating application traffic to workload instances that sit behind it.

For example, in accordance with embodiments of the present disclosure, the nontransient memory device 51 comprises a set of executable instructions for configuring a processor 40 to: apply a reverse-tunnel proxy to a centralized service tier by: (a) initiating a secure connection from a proxy instance to at least one service center element, whereby at least one available network-adjacent resource is communicated to a service center; (b) forwarding application traffic towards the at least one available network-adjacent resource behind the proxy instance by using the secure connection; (c) one of: continuously discovering at least one network adjacent service, corresponding to the at least one available network-adjacent resource, from the proxy instance and continuously discovering a cloud environment by a central controller, apart from the proxy instance, and communicating continuous service discovery information relating to the cloud environment to one of the proxy instance and the service center; (d) registering and authorizing any unknown proxy instances by the service center, and establishing authorization to tunnel resources; (e) if desired, from the proxy instance, publishing only the at least one available network-adjacent resource, corresponding to a local instance; (f) automatically generating at least one routing instance and at least one node-mapped configuration at the service center based on the continuous service discovery information from one of the proxy instance and the central controller; and (g) registering at least one proxy instance within a single CSP environment to the service center, whereby the service center is enabled to horizontally scale traffic across reverse-tunnels.

The communication interface of the network traffic management apparatus operatively couples and communicates between the network traffic management apparatus, the server devices, and/or the client devices, which are all coupled together by the communication network(s), although other types and/or numbers of communication networks or systems with other types and/or numbers of connections and/or configurations to other devices and/or elements can also be used.

Still referring to FIG. 2 and referring back to FIG. 1, the communication interface 60 of the network traffic management apparatus A operatively couples and communicates between the network traffic management apparatus A, the server devices 10, and/or the client devices 20, which are all coupled together by the communication network(s) 30, although other types and/or numbers of communication networks or systems with other types and/or numbers of connections and/or configurations to other devices and/or elements can also be used. By example only, the communication network(s) 30 can include local area network(s) (LAN(s)) or wide area network(s) (WAN(s)); and the communication network(s) 30 can use Transmission Control Protocol/Internet Protocol (TCP/IP) over Ethernet and industry-standard protocols, although other types and/or numbers of protocols and/or communication networks can be used. The communication network(s) 30, in this example, can employ any suitable interface mechanisms and network communication technologies including, for example, teletraffic in any suitable form, e.g., voice, modem, and the like, Public Switched Telephone Network (PSTNs), Ethernet-based Packet Data Networks (PDNs), combinations thereof, and the like. The communication network(s) 30 can also include direct connection(s), e.g., for when a device, such as the network traffic management apparatus A, one or more of the client devices 20, or one or more of the server devices 10 operate as virtual instances on the same physical machine).

Still referring to FIG. 2, while the network traffic management apparatus A is illustrated in this example as comprising a single device, the network traffic management apparatus A in other examples can include a plurality of devices or blades each having one or more processors 40 (each processor 40 having one or more processing cores) that implement one or more steps of the herein described technology. In these examples, one or more of the devices can have a dedicated communication interface or a dedicated memory. Alternatively, one or more of the devices can utilize the memory 50, communication interface 60, or other hardware or software components of one or more other devices included in the network traffic management apparatus A. Additionally, one or more of the devices that together comprise the network traffic management apparatus A in other examples can be standalone devices or integrated with one or more other devices or apparatuses, such as one of the server devices, for example. Moreover, one or more of the devices of the network traffic management apparatus A in these examples can be in a same or a different communication network including one or more public, private, or cloud networks, for example.

Still referring to FIG. 2 and referring back to FIG. 1, each of the server devices 10 of the network traffic management system S in this example includes one or more processors (not shown), a memory (not shown), and a communication interface (not shown), which are coupled together by a bus or other communication link, although other numbers and/or types of network devices could be used. The server devices 10, in this example, process requests received from the client devices 20 via the communication network(s) according to the hypertext transfer Protocol (HTTP) based application Request for Comments (RFC) Protocol, for example. Various applications may be operating on the server devices 10 and transmitting data, e.g., files or Web pages, to the client devices 20 via the network traffic management apparatus A in response to requests from the client devices 20. The server devices 10 may be hardware or software or may represent a system with multiple servers 10 in a pool, which may include internal or external networks.

Still referring to FIG. 2 and referring back to FIG. 1, although the server devices 10 are illustrated as single devices, one or more actions of each of the server devices 10 may be distributed across one or more distinct network computing devices that together comprise one or more of the server devices 10. Moreover, the server devices 10 are not limited to a particular configuration. Thus, the server devices 10 may contain a plurality of network computing devices that operate using a master/slave approach, whereby one of the network computing devices of the server devices 10 operates to manage and/or otherwise coordinate operations of the other network computing devices. The server devices 10 may operate as a plurality of network computing devices within a cluster architecture, a peer-to peer architecture, virtual machines, or within a cloud architecture, for example.

Still referring to FIG. 2 and referring back to FIG. 1, thus, the technology disclosed herein is not to be construed as being limited to a single environment and other configurations and architectures are also envisaged. For example, one or more of the server devices 10 can operate within the network traffic management apparatus A, itself, rather than as a stand-alone server device communicating with the network traffic management apparatus A via the communication network(s) 30. In this example, the one or more server devices 10 operate within the memory 50 of the network traffic management apparatus A.

Still referring to FIG. 2 and referring back to FIG. 1, the client devices 20 of the network traffic management system S, in this example, include any type of computing device that can interface with a communication network 30, such as mobile computing devices, desktop computing devices, laptop computing devices, tablet computing devices, notebook computing devices, virtual machines, including cloud-based computers, or the like. Each of the client devices 20 in this example includes a processor (not shown), a memory (not shown), and a communication interface (not shown), which are coupled together by a bus (not shown) or other communication link, although other numbers and/or types of network devices could be used.

Still referring to FIG. 2 and referring back to FIG. 1, the client devices 20 may run interface applications, such as standard Web browsers or standalone client applications, which may provide an interface to make requests for, and receive content stored on, one or more of the server devices 10 via the communication network(s). The client devices 20 may further include a display device (not shown), such as a display screen or touchscreen, and/or an input device, such as a keyboard for example. Although the exemplary network traffic management system S, with the network traffic management apparatus A, server devices 10, client devices 20, and communication network(s) 30 are described and illustrated in the Drawing, other types and/or numbers of systems, devices, components, and/or elements in other topologies can be used. Understood is that the systems herein described are for exemplary purposes, as many variations of the specific hardware and software used to implement the examples are possible.

Still referring to FIG. 2 and referring back to FIG. 1, at least one component depicted in the network traffic management system S, such as the network traffic management apparatus A, client devices 20, or server devices 10, for example, is configurable to operate as virtual instances on the same physical machine. In other words, at least one of the network traffic management apparatus A, client devices 20, or server devices 10 is operable on the same physical device, rather than as separate devices communicating through communication network(s). Additionally, the system S may comprise more or fewer network traffic management apparatus A, client devices 20, or server devices 10 than illustrated in FIG. 1. The client devices 20 could also be implemented as applications on the network traffic management apparatus A itself as a further example.

Still referring to FIG. 2 and referring back to FIG. 1, in addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system (s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof. The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

While the network traffic management apparatus is illustrated in this example as including a single device, the network traffic management apparatus in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management apparatus.

Additionally, one or more of the devices that together comprise the network traffic management apparatus in other examples can be standalone devices or integrated with one or more other devices or apparatuses, such as one of the server devices, for example. Moreover, one or more of the devices of the network traffic management apparatus in these examples can be in a same or a different communication network including one or more public, private, or cloud networks, for example.

Each of the server devices of the network traffic management system in this example includes one or more processors, a memory, and a communication interface, which are coupled together by a bus or other communication link, although other numbers and/or types of network devices could be used. The server devices in this example process requests received from the client devices via the communication network(s) according to the HTTP-based application RFC protocol, for example. Various applications may be operating on the server devices and transmitting data (e.g., files or Web pages) to the client devices via the network traffic management apparatus in response to requests from the client devices. The server devices may be hardware or software or may represent a system with multiple servers in a pool, which may include internal or external networks.

Although the server devices are illustrated as single devices, one or more actions of each of the server devices may be distributed across one or more distinct network computing devices that together comprise one or more of the server devices. Moreover, the server devices are not limited to a particular configuration. Thus, the server devices may contain a plurality of network computing devices that operate using a master/slave approach, whereby one of the network computing devices of the server devices operate to manage and/or otherwise coordinate operations of the other network computing devices. The server devices may operate as a plurality of network computing devices within a cluster architecture, a peer-to-peer architecture, virtual machines, or within a cloud architecture, for example.

Thus, the technology disclosed herein is not to be construed as being limited to a single environment and other configurations and architectures are also envisaged. For example, one or more of the server devices can operate within the network traffic management apparatus itself rather than as a stand-alone server device communicating with the network traffic management apparatus via the communication network(s). In this example, the one or more server devices operate within the memory of the network traffic management apparatus.

The client devices of the network traffic management system in this example include any type of computing device that can receive, render, and facilitate user interaction with a webtop, such as mobile computing devices, desktop computing devices, laptop computing devices, tablet computing devices, virtual machines (including cloud-based computers), or the like. Each of the client devices in this example includes a processor, a memory, and a communication interface, which are coupled together by a bus or other communication link, although other numbers and/or types of network devices could be used.

The client devices may run interface applications, such as standard Web browsers or standalone client applications, which may provide an interface to make requests for, and receive content stored on, one or more of the server devices via the communication network(s). The client devices may further include a display device, such as a display screen or touchscreen, and/or an input device, such as a keyboard for example.

Although the exemplary network traffic management system with the network traffic management apparatus, server devices, client devices, and communication network(s) are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system, such as the network traffic management apparatus, client devices, or server devices, for example, may be configured to operate as virtual instances on the same physical machine. In other words, one or more of the network traffic management apparatus, client devices, or server devices may operate on the same physical device rather than as separate devices communicating through communication network(s). Additionally, there may be more or fewer network traffic management apparatus, client devices, or server devices than illustrated in FIG. 1. The client devices could also be implemented as applications on the network traffic management apparatus itself as a further example.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein. An exemplary method of utilizing a reverse tunnel proxy in a cloud environment will now be described with reference to FIGS. 1-7.

Figure 3:
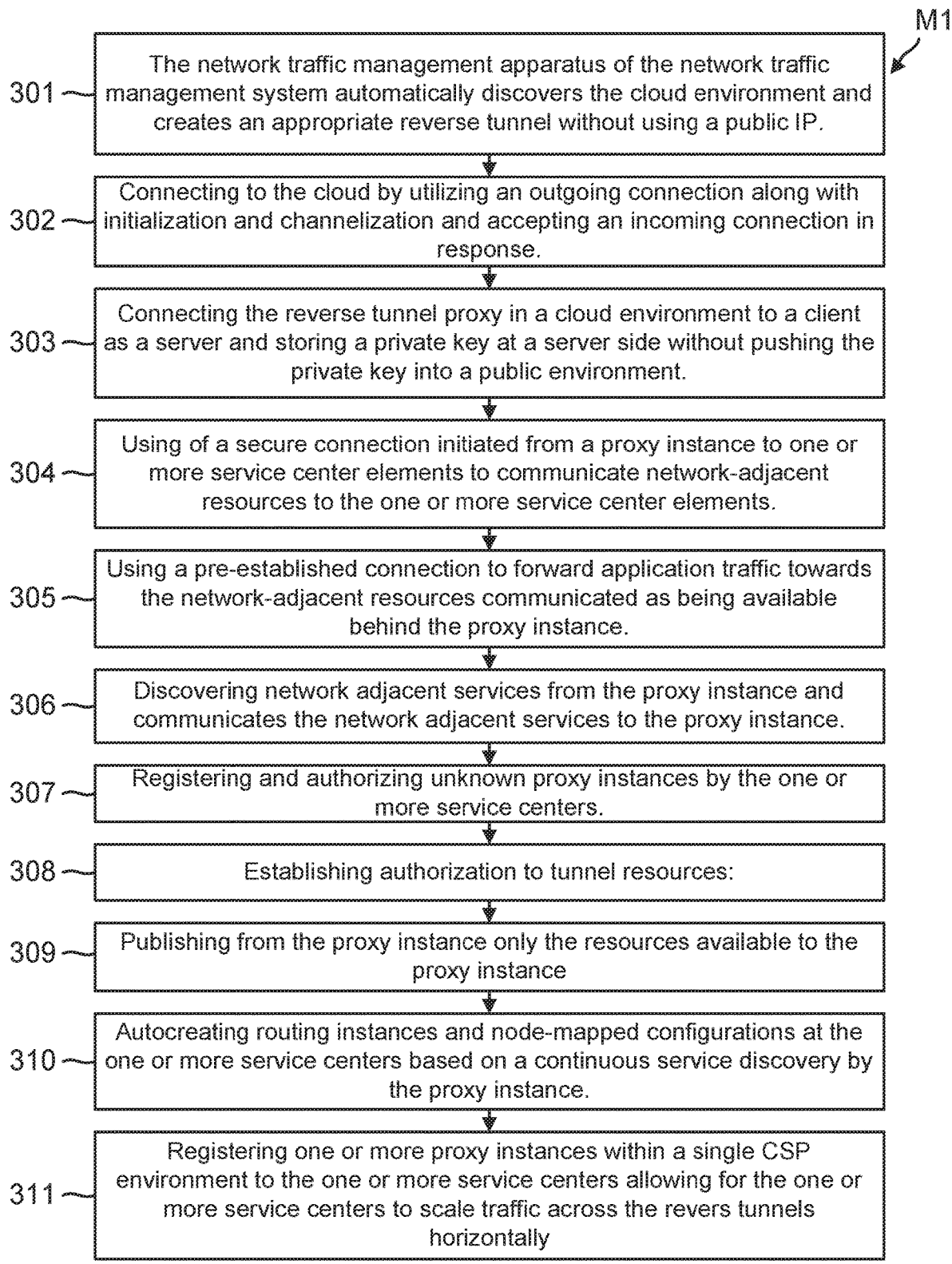
FIG. 3 is an exemplary flow chart illustrating a method for automatically discovering a cloud environment and generating a reverse-tunnel proxy.

Referring to FIG. 3, this flow diagram illustrates a method M1 comprising automatically discovering a cloud environment and generating a reverse-tunnel proxy, without using a public IP, e.g., by way of a set of executable instructions storable on a nontransient memory device of a network traffic management apparatus of a network traffic management system, as indicated by block 301, in accordance with an embodiment of the present disclosure. The exemplary method M1 may also include the steps of connecting to the cloud by utilizing an outgoing connection along with initialization and channelization and accepting an incoming connection in response, as indicated by block 302. Further, the exemplary method M1 may also include the steps of connecting the reverse tunnel proxy in a cloud environment to a client as a server and storing a private key at a server side without pushing the private key into a public environment, as indicated by block 303.

Still referring to FIG. 3, the exemplary method M1 may also include the steps of using of a secure connection initiated from a proxy instance to one or more service center elements to communicate network-adjacent resources to the one or more service center elements, as indicated by block 304; using a pre-established connection to forward application traffic towards the network-adjacent resources communicated as being available behind the proxy instance, as indicated by block 305; discovering network adjacent services from the proxy instance and communicates the network adjacent services to the proxy instance, as indicated by block 306; registering and authorizing unknown proxy instances by the one or more service centers, as indicated by block 307; establishing authorization to tunnel resources, as indicated by block 308; publishing from the proxy instance only the resources available to the proxy instance, as indicated by block 309; auto-creating routing instances and node-mapped configurations at the one or more service centers based on a continuous service discovery by the proxy instance, as indicated by block 310; and registering one or more proxy instances within a single CSP environment to the one or more service centers allowing for the one or more service centers to scale traffic across the reverse tunnels horizontally, as indicated by block 311.

Still referring to FIG. 3, the method M1 alternatively comprises: a set of executable instructions for configuring a processor 40 to: apply a reverse-tunnel proxy to a centralized service tier by: (a) initiating a secure connection from a proxy instance to at least one service center element, whereby at least one available network-adjacent resource is communicated to a service center; (b) forwarding application traffic towards the at least one available network-adjacent resource behind the proxy instance by using the secure connection; (c) one of: continuously discovering at least one network adjacent service, corresponding to the at least one available network-adjacent resource, from the proxy instance and continuously discovering a cloud environment by a central controller, apart from the proxy instance, and communicating continuous service discovery information relating to the cloud environment to one of the proxy instance and the service center; (d) registering and authorizing any unknown proxy instances by the service center, and establishing authorization to tunnel resources; (e) if desired, from the proxy instance, publishing only the at least one available network-adjacent resource, corresponding to a local instance; (f) automatically generating at least one routing instance and at least one node-mapped configuration at the service center based on the continuous service discovery information from one of the proxy instance and the central controller; and (g) registering at least one proxy instance within a single CSP environment to the service center, whereby the service center is enabled to horizontally scale traffic across reverse-tunnels.

Figure 4:
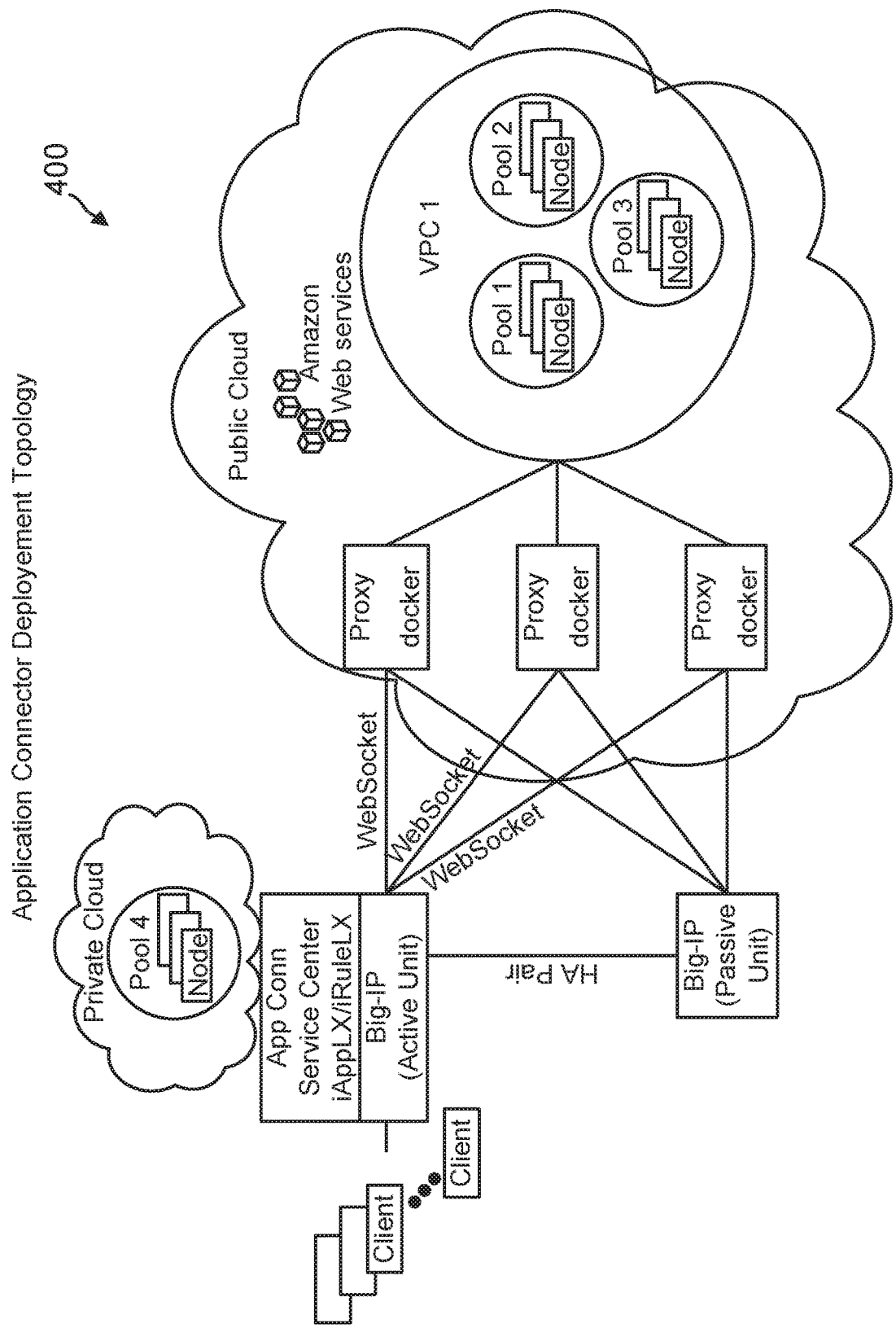
FIG. 4 is an exemplary schematic diagram illustrating an exemplary application connector deployment topology.

Referring to FIG. 4, this schematic diagram illustrates an exemplary application connector deployment topology 400 with which the method M1 may be implemented, in accordance with an embodiment of the present disclosure.

Figure 5:
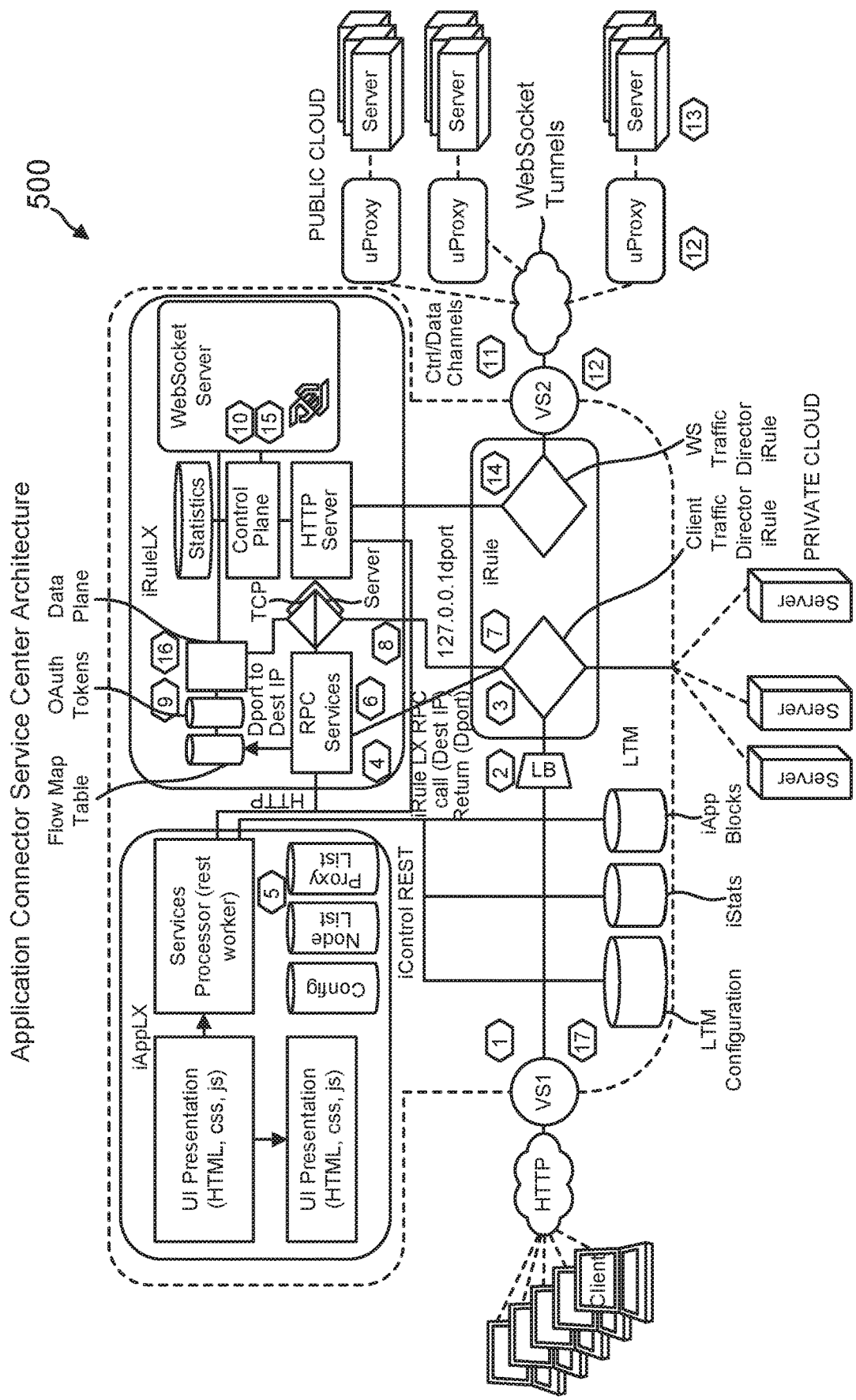
FIG. 5 is an exemplary schematic diagram illustrating an exemplary application connector service center architecture.

Referring to FIG. 5, this schematic diagram illustrates an exemplary application connector service center architecture 500, with which the method M1 may be implemented, in accordance with an embodiment of the present disclosure. In operation, clients connect to one or more Virtual Servers (VS1) and produce a request. The LTM load balances the request to a private or public cloud server. The Client Traffic Director iRule executes upon a LB decision making an iLX RPC call to determine if the server is in public or private cloud. The iLX RPC performs an HTTP request to the iAppLX rest worker API to lookup the selected server. The iAppLX rest worker looks up server IP address to determine if the server is in public or private cloud and provides response to iLX RPC. If the server is in the public cloud, iLX RPC initializes a TCP Server on a predetermined port to handle the flow to the public cloud and provides port to iRule. If the server is in the private cloud Client Traffic Director iRule takes no action on the LB decision. If the server was in the Public cloud, the iRule redirects the request/flow to the TCP Server port. The TCP Server accepts the connection and forwards the request/flow to the DataPlane. The DataPlane wraps the request in a tunnel which contains the client source IP, Port and cloud server IP and port and forwards to the WebSocket Server. The WebSocket Server encapsulates the request and forwards to Proxy in AWS The Requests are transferred over SSL secure Web Socket tunnel. The Proxy receives the request, extracts encapsulating tunnel, determines destination server IP and port and forwards the request to the appropriate server. The server fulfills the request and produces a response which traverses over the WebSocket Tunnel to Virtual Server VS2 which has an SSL profile attached. Server Traffic Director iRule directs the response to the WebSocket Server process in iRulesLX. WebSocket Server de-capsulates the response and forwards to the DataPlane. The DataPlane removes the tunnel containing source client IP and port and forwards the response to the appropriate socket the client. The response then reaches the client.

Figure 6:
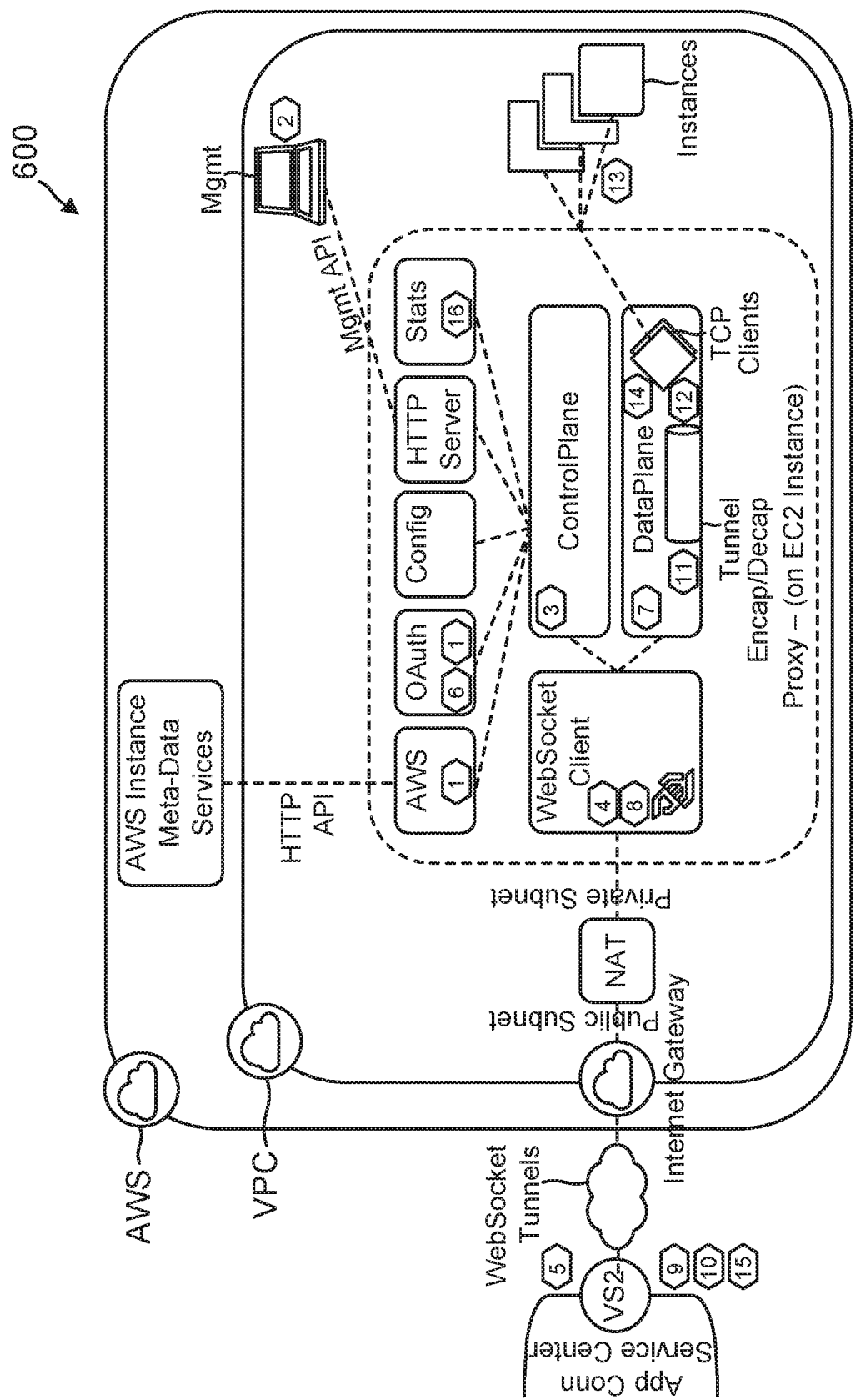
FIG. 6 is an exemplary schematic diagram illustrating an exemplary application connector proxy architecture.

Referring to FIG. 6, this schematic diagram illustrates an exemplary application connector proxy architecture 600, in accordance with an embodiment of the present disclosure. In operation, upon Proxy process startup, the AWS module performs an HTTP request to AWS instance services to obtains Instance ID and VPC ID. Proxy management is provided through an HTTP management API. Upon receiving a Connect API request, the ControlPlane initiates a WebSocket control channel connection. The WebSocket client opens a control channel connection to the Service Center. The Service Center accepts control channel connections, but without authorization, the control channel has no privileges to perform control functions. Upon control channel establishment, the OAuth module negotiates to obtain authorization with the Service Center. Once OAuth has succeeded, the DataPlane initiates a WebSocket data channel connection providing the OAuth token as a supported protocol in the HTTP header. The WebSocket client attempts to open a data channel connection to the Service Center. Prior to allowing a data channel to connect, the Service Center validates the token provided in the supported protocol header. Upon load balancing a client request to a cloud server, the request is tunnel encapsulated and forwarded down the WebSocket data channel to the Proxy. The Proxy removes the tunnel encapsulation and determines the destination server and port. The Proxy opens a TCP socket to the server and forwards the request. The server provides a response. The proxy receives, re-capsulates the response and forwards it to the WebSocket client data channel. The response is received by the WebSocket Service Center and ultimately provided to the client. The Stats module collects parameters on traffic and connection latency and periodically pushes a stats message to the Service Center.

Figure 7:
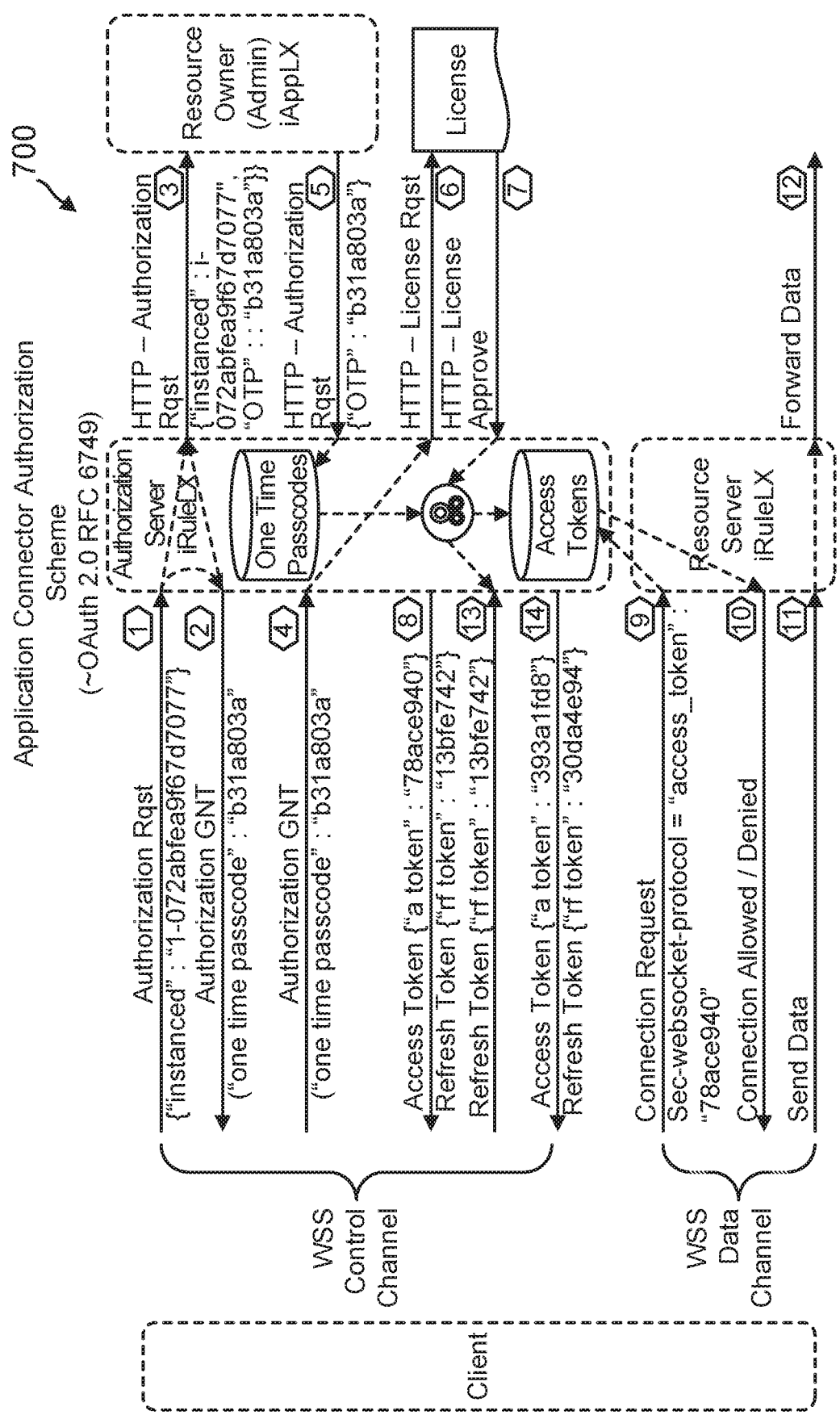
FIG. 7 is a schematic diagram illustrating an exemplary application connector authorization scheme portion of the network traffic management apparatus.

Referring to FIG. 7, this schematic diagram illustrates an exemplary application connector authorization scheme portion of the network traffic management apparatus, in accordance with an embodiment of the present disclosure. In this exemplary embodiment, the Application Connector ("AC") establishes a control and data WebSocket connection to a Service Center Control Channel. The AC utilizes the control channel to obtain the necessary authorization. The AC data channel is not allowed to connect to the Service Center unless the AC has been authorized. Prior to authorization, the AC cannot access or modify any network traffic management apparatus resources. The AC utilizes the control channel to perform all management tasks including: adding, deleting, and changing state of nodes; posting stats; latency measurements; and node health check commands and status. Further, all client server traffic is passed over the data channel.

Still referring to FIG. 7, in operation, after initially establishing a control channel connection to a Service Center the AC Proxy sends an Authorization Request to Authorization Server which is implemented in iAppLX and iRulesLX. The Authorization Request contains the unique identity of the AC in the request. The Authorization Server respond s with a One Time Pass-code (OTP) to the AC. The Authorization Server forwards the AC identity in the Authorization Request to the resource owner. Upon receiving the OTP the AC sends an authorization grant request to the Authorization Server. The Authorization Server will deny the request until the Resource Owner authorizes the AC. The Resource Owner approves the AC which results in the Authorization Server producing access and refresh tokens to the AC. Upon receiving authorization approval from the Resource Owner for the AC, the Authorization Server responds to the Authorization GNT with Access/Refresh tokens. The tokens typically have a lifetime of 30 days and require refreshing prior to expiration. Once the AC has obtained access tokens, i.e. authorization, it initiates a Data Channel connection to the Service Center. The AC must present the access token in the sec-websocket-protocol header upon Data Channel connection request or the Data Channel connection will not be allowed to connect. The AC now has access to the Data Channel resource. If at any point in the future authorization is revoked or expires, the Data Channel will be closed. Upon authorization, the AC has full use of both the Data and Control Channels. Prior to the token expiring, the AC sends a Refresh Token, providing the previously obtained refresh token in the request. The Authorization Server responds by creating a new set of access and refresh tokens and provides them in the response. With this technology, the disclosed reverse tunnel proxy utilizes a reversed-direction secure connection, and the registration and termination of this connection for the purpose of initiating application traffic to workload instances that sit behind it.

Having thus described the basic concept of the present disclosure, the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the present disclosure. Additionally, the recited order of processing elements or sequences, or the use of numbers, letters, or other designations therefore, is not intended to limit the claimed processes to any order except as may be specified in the claims. Accordingly, the present disclosure is limited only by the following claims and equivalents thereto.

At least some aspects disclosed are embodied, at least in part, in software. That is, some disclosed techniques and methods are carried out in a computer system or other data processing system in response to its processor, such as a microprocessor, executing sequences of instructions contained in a memory, such as ROM, volatile RAM, non-volatile memory, cloud, cache, or a remote storage device.

A computer readable storage medium is used to store software and data which when executed by a data processing system causes the system to perform various methods or techniques of the present disclosure. The executable software and data is storable in various places, including for example ROM, volatile RAM, non-volatile memory, cloud, and/or cache. Portions of this software and/or data are stored in any one of these storage devices.

Examples of computer-readable storage media may include, but are not limited to, recordable and non-recordable type media such as volatile and non-volatile memory devices, read only memory (ROM), random access memory (RAM), flash memory devices, floppy and other removable disks, magnetic disk storage media, optical storage media, e.g., compact discs (CDs), digital versa tile disks (DVDs), etc.), among others. The instructions can be embodied in digital and analog communication links for electrical, optical, acoustical or other forms of propagated signals, such as carrier waves, infrared signals, digital signals, and the like. The storage medium is the internet cloud, or a computer readable storage medium such as a disc.

Furthermore, at least some of the methods described herein are capable of being distributed in a computer program product comprising a computer readable medium that bears computer usable instructions for execution by one or more processors, to perform aspects of the method s described. The medium is provided in various forms such as, but not limited to, one or more diskettes, compact disks, tapes, chips, universal server bus (USB) keys, external hard drives, wire-line transmissions, satellite transmissions, internet transmissions or downloads, magnetic and electronic storage media, digital and analog signals, and the like. The computer usable instructions may also be in various forms, including compiled and non-compiled code.

At least some of the elements of the systems described herein are implemented by software, or a combination of software and hardware. Elements of the system that are implemented via software are written in a high-level programming language such as object-oriented programming or a scripting language. Accordingly, the program code is written in C, C++, J++, or any other suitable programming language and may comprise functions, modules or classes, as is known to those skilled in computer programming. At least some of the elements of the system that are implemented via software are written in assembly language, machine language or firmware as needed. In either case, the program code can be stored on storage media or on a computer readable medium that is readable by a general or special purpose programmable computing device having a processor, an operating system and the associated hardware and software that is necessary to implement the functionality of at least one of the embodiments described herein. The program code, when read by the computing device, configures the computing device to operate in a new, specific, and predefined manner for performing at least one of the methods described herein.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, any particular order to steps or stages of methods or processes described in this disclosure is not intended or implied. In many cases the order of process steps is varied without changing the purpose, effect, or import of the methods described.

Information as herein shown and described in detail is fully capable of attaining the above-described embodiments of the present disclosure and the presently preferred embodiment, if any, of the present disclosure, and is, thus, representative of the subject matter which is broadly contemplated by the present disclosure. The scope of the present disclosure fully encompasses other embodiments and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a device, an apparatus, a system, or a method to address each, and every, problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail is made, without departing from the spirit and scope of the present disclosure, as set forth in the appended claims, as is apparent, or may become apparent, to those of ordinary skill in the art, are also encompassed by the present disclosure.

INDUSTRIAL APPLICABILITY

The present disclosure industrially applies to application traffic management (ATM) for Cloud infrastructure and services. More particularly, present disclosure industrially applies to application optimization for tunneling. Even more particularly, present disclosure industrially applies to application optimization in relation to application security for security socket layers (SSLs), tunneling for a virtual private network (VPN), scaling for hardware, and Hybrid Cloud.

What is claimed:

1. A method of initiating application traffic to a plurality of workload instances by implementing a tunnel proxy, the method comprising:

initiating a secure connection from a proxy instance to at least one service center element, whereby at least one available network-adjacent resource is communicated to a service center;

continuously discovering at least one network adjacent service, corresponding to the at least one available network-adjacent resource, from the proxy instance, or continuously discovering a cloud environment by a central controller, apart from the proxy instance, and communicating continuous service discovery information relating to the cloud environment to one of the proxy instance or the service center;

automatically generating at least one routing instance and at least one node-mapped configuration at the service center based on the continuous service discovery information from one of the proxy instance or the central controller; and forwarding application traffic towards the at least one available network-adjacent resource behind the proxy instance by using the secure connection.

2. The method of claim 1, further comprising registering and authorizing any unknown proxy instances by the service center, and establishing authorization to tunnel resources.

3. The method of claim 1, further comprising, from the proxy instance, publishing only the at least one available network-adjacent resource, corresponding to a local instance.

4. The method of claim 1, further comprising registering at least one proxy instance within a single Cloud Service Provider (CSP) environment to the service center, whereby the service center is enabled to horizontally scale traffic across reverse-tunnels.

5. The method of claim 1, wherein continuously discovering the at least one network adjacent service, corresponding to the at least one available network-adjacent resource, from the proxy instance comprises automatically continuously discovering the at least one network adjacent service, corresponding to the at least one available network-adjacent resource, from the proxy instance; and wherein continuously discovering a cloud environment by a central controller, apart from the proxy instance, and communicating continuous service discovery information relating to the cloud environment to one of the proxy instance and the service center comprises automatically continuously discovering a cloud environment by a central controller, apart from the proxy instance, and communicating continuous service discovery information relating to the cloud environment to one of the proxy instance and the service center.

6. The method of claim 1, further comprising:

connecting to a cloud environment by utilizing an outgoing connection along with initialization and channelization; and responding by accepting an incoming connection.

7. The method of claim 6, further comprising:

connecting the reverse-tunnel proxy in the cloud environment to a client as a server;

and storing a private key at a server side without pushing the private key into a public environment.

8. A system for providing a device for initiating application traffic to a plurality of workload instances by implementing a tunnel proxy, the system comprising a processor and a non-transient memory device comprising executable instructions to configure the processor to:

initiate a secure connection from a proxy instance to at least one service center element, whereby at least one available network-adjacent resource is communicated to a service center; and forward application traffic towards the at least one available network-adjacent resource behind the proxy instance by using the secure connection;

continuously discover at least one network adjacent service, corresponding to the at least one available network-adjacent resource, from the proxy instance, or continuously discover a cloud environment by a central controller, apart from the proxy instance, and communicating continuous service discovery information relating to the cloud environment to one of the proxy instance or the service center; and automatically generate at least one routing instance and at least one node-mapped configuration at the service center based on the continuous service discovery information from one of the proxy instance or the central controller.

9. The system of claim 8, wherein the non-transient memory device further comprises executable instructions to further configure the processor to: register and authorize any unknown proxy instances by the service center, and establish authorization to tunnel resources.

10. The system of claim 8, wherein the non-transient memory device further comprises executable instructions to further configure the processor to: from the proxy instance, publish only the at least one available network-adjacent resource, corresponding to a local instance.

11. The system of claim 8, wherein the non-transient memory device further comprises executable instructions to further configure the processor to register at least one proxy instance within a single Cloud Service Provider (CSP) environment to the service center, whereby the service center is enabled to horizontally scale traffic across reverse-tunnels.

12. The system of claim 8, wherein the non-transient memory device further comprises executable instructions to further configure the processor to:
automatically continuously discover the at least one network adjacent service, corresponding to the at least one available network-adjacent resource, from the proxy instance; and
automatically continuously discover a cloud environment by a central controller, apart from the proxy instance, and communicate continuous service discovery information relating to the cloud environment to one of the proxy instance and the service center.

13. The system of claim 8, wherein the non-transient memory device further comprises executable instructions to further configure the processor to:
connect to a cloud environment by utilizing an outgoing connection along with initialization and channelization; and
respond by accepting an incoming connection.

14. The system of claim 13, wherein the non-transient memory device further comprises executable instructions to further configure the processor to:
connect the reverse-tunnel proxy in the cloud environment to a client as a server; and
store a private key at a server side without pushing the private key into a public environment.

15. A non-transitory computer readable medium having stored thereon instructions for initiating application traffic to a plurality of workload instances by implementing a tunnel proxy, the instructions configuring at least one processor to:
initiate a secure connection from a proxy instance to at least one service center element, whereby at least one available network-adjacent resource is communicated to a service center; and forward application traffic towards the at least one available network-adjacent resource behind the proxy instance by using the secure connection;
automatically continuously discover at least one network adjacent service, corresponding to the at least one available network-adjacent resource, from the proxy instance;
automatically continuously discover a cloud environment by a central controller, apart from the proxy instance, and communicating continuous service discovery information relating to the cloud environment to one of the proxy instance and the service center;
register and authorize any unknown proxy instances by the service center, and establish authorization to tunnel resources;
from the proxy instance, publish only the at least one available network-adjacent resource, corresponding to a local instance;
automatically generating at least one routing instance and at least one node-mapped configuration at the service center based on the continuous service discovery information from one of the proxy instance and the central controller;
register at least one proxy instance within a single Cloud Service Provider (CSP) environment to the service center, whereby the service center is enabled to horizontally scale traffic across reverse-tunnels;
connect to a cloud environment by utilizing an outgoing connection along with initialization and channelization;
respond by accepting an incoming connection;
connect the reverse-tunnel proxy in the cloud environment to a client as a server; and
store a private key at a server side without pushing the private key into a public environment.

* * * * *